July 29, 1969 — P. F. MAEDER ET AL — 3,457,782
TURBINE TYPE FLUID FLOW MEASURING DEVICE
Filed Oct. 5, 1966
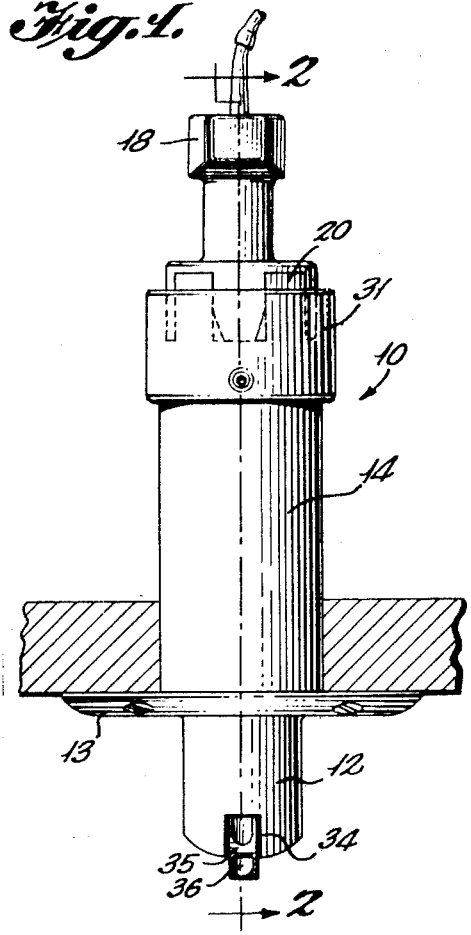
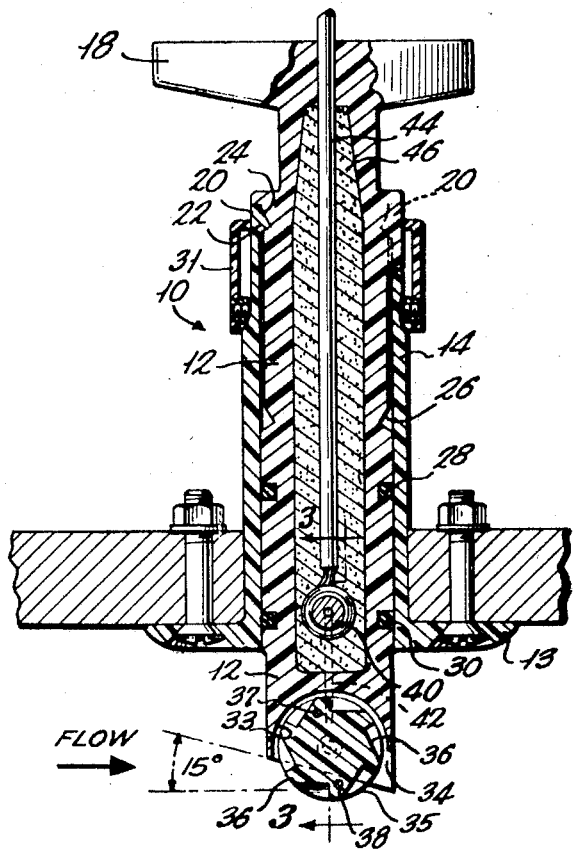
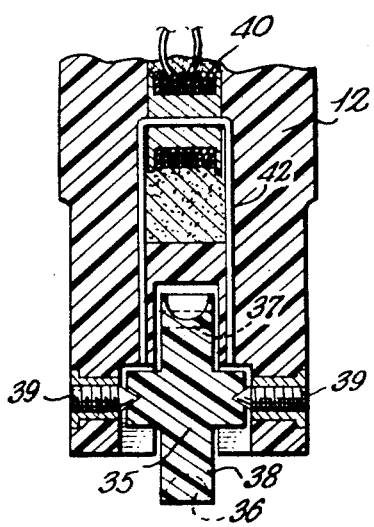
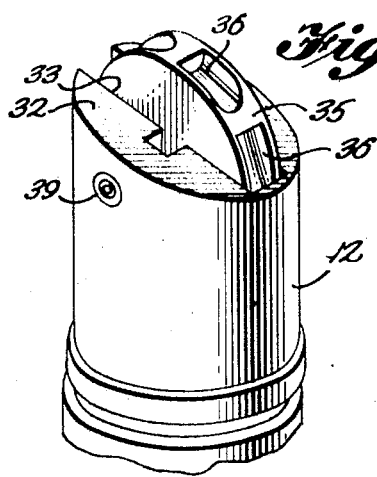
INVENTORS
Carl Cometta &
Paul F. Maeder
BY Lane, Aitken, Dunner & Ziems
ATTORNEYS United States Patent Office 3,457,782
Patented July 29, 1969

3,457,782
TURBINE TYPE FLUID FLOW MEASURING DEVICE
Paul F. Maeder, Rumford, and Carl Cometta, East Providence, R.I., assignors, by mesne assignments, to Mac-Cleaster-Schwarz, a division of William M. Pearson Travel Agency, Inc., Providence, R.I., a corporation of Rhode Island
Filed Oct. 5, 1966, Ser. No. 584,537
Int. Cl. G01c 21/00
U.S. Cl. 73—187          13 Claims

ABSTRACT OF THE DISCLOSURE

A speed logging transducer comprising an elongated probe mountable on the bottom of a boat with one end of the probe projecting into the water. A small water wheel is rotatably mounted on the projecting end of the probe in position to be rotated by the water. A magnet is mounted on the wheel for rotation therewith and passes through a magnetic circuit in the body of the probe to produce electrical impulses indicating the speed of the boat.

---

This invention relates to fluid flow measuring devices, and more particularly to an underwater transducer for measuring boat speed as it travels through water.

To insure proper operation of a marine vehicle, an accurate indication of water speed is necessary. Prior art boat speed logging devices include various propeller type devices. However, such devices are normally placed entirely in the water flow path. With the water flow completely around the propeller, turbulence and eddies are produced which have a tendency to cause variations in the rotational speed of the propeller. Furthermore, there is a tendency for debris to jam the propeller. Another speed logging device is a wand type which is immersed in water to measure drag. The deviation of the wand from the normal position is proportional to speed. This type of logging device also tends to pick up debris in the water, and is subject to marine growth. Furthermore, bubbles are produced which interfere wtih the measurement of the true rate of flow characteristics. Many other prior art logging devices ae constructed of metallic movable parts which deteriorate and corrode in water.

The present invention overcomes the disadvantages of the prior art devices. The speed logging transducer comprises a movable cylindrical probe which can be mounted on the underside of a boat hull by a fitting secured to the hull with one end of the probe projecting into the water. The end of the probe is provided with a small, rotatably mounted water wheel having a plurality of buckets, closed at their sides, which are recessed in the peripheral edge of the wheel. The probe is mounted so that the wheel is rotated by the water along an axis transverse to the direction of movement of the boat through the water. A magnet is mounted within the rotatable wheel in such a manner that it periodically passes through a magnetic circuit formed by a horseshoe-type magnet and coil mounted in the body of the probe. As the wheel rotates the magnet through the magnetic circuit, electrical impulses are produced in the coil which are transmitted to a suitable speed indicating instrument, such as the type described in a copending application of Paul F. Maeder entitled Marine Instrument, filed on the same day as, and assigned to the assignee of, the present application and given Ser. No. 584,572.

A feature of the novel speed logging transducer concerns recessing of more than half of the rotatable wheel within a slot in the end of the probe. This directs the water against less than one half of the wheel to insure smooth and consistent rotation in one direction. Recessing of the rotatable wheel also prevents fouling.

Another feature is that the slot within which the wheel rotates is open on the downstream side of the probe to provide a relief space on the downstream side of the probe. This prevents a buildup of pressure on that side of the probe which would vary the rotation characteristics of the wheel.

A further feature resides in an inclined surface on the end of the probe which faces downstream and projects laterally from both sides of the wheel. This causes the water to veer off away from the wheel. This construction insures that separation bubbles of essentially stagnant water do not form at the end of the probe to vary the rotation characteristics of the wheel.

Among the objects of the present invention, therefore, are the provision of a novel underwater transducer to measure fluid flow which is particularly adapted to measure the speed of a boat with exceptional accuracy, the provision of an adjustably mounted underwater transducer having a variable magnetic circuit for producing signals in response to speed and the provision of a novel, anti-fouling wheel which rotates on the transducer directly proportional to the speed of a boat through water.

Other objects and further scope of applicability of the present invention will become apparent from the detailed description to follow, taken in conjunction with the accompanying drawings, in which:

FIG. 1 is a elevational view of the downstream side of a transducer illustrating one embodiment of the present invention;

FIG. 2 is a sectional view taken along the line 2—2 of FIG. 1;

FIG. 3 is a sectional view taken along line 3—3 of FIG. 2; and

FIG. 4 is an enlarged fragmentary perspective view of the water wheel end of the transducer of FIG. 1.

Referring to FIGS. 1 and 2, an underwater transducer 10 is shown which illustrates a preferred embodiment of the invention. It is comprised of a hollow elongated plastic probe 12 slidably mounted within a plastic mounting sleeve 14. A flange 13 is provided on the sleeve 14 which is mounted through the hull of a boat, for example, and is secured thereto by screws or the like extending through the flange 13. The upper end of the probe 12 which projects into the interior of the boat is formed with a handle 18 which is used to slide the probe 12 within the mounting sleeve 14 between an operative and non-operative position. The end of the mounting sleeve 14 is provided with a plurality of fingers 20 having projections 22 which, when the probe 12 is in its operative position, engage detent slots 24 integrally formed on the probe 12. In the non-operative position, the projections 22 on the fingers 20 engage a detent groove 26 to prevent the probe 12 from pulling completely out of the mounting sleeve 14. A snug fit between the probe 12 and the mounting sleeve 14 is provided by means of two O-rings 28 and 30 which are preferably neoprene or other water-resistant material. A retainer ring 31 maintains the probe 12 in its operative position.

As best seen in FIGS. 2 and 4, the lower end of the probe 12 is formed with an inclined surface 32 facing upstream. Stated otherwise the inclined surface 32 slopes from the upstream side of the probe toward the downstream side with more of the partially recessed water wheel being recessed beneath said surface on the downstream side than on the upstream side. A slot 33 having a pressure relief opening 34 is formed in the inclined surface. A rotatable water wheel 35 having a plurality of recessed pockets or buckets 36 formed about the peripheral edge of the wheel 35 is rotatably journalled in the slot 33 by pointed set screws 39. The sides of the buckets 36 of the water wheel are preferably closed as illustrated. Since the pointed set screws 39 communicate with the slot 33, as illustrated in FIGURES 2-4 it is apparent that more than one half of the water wheel 35 is recessed in the inclined surface.

Referring to FIGS. 2 and 3, a small permanent magnet 37 is mounted within the wheel 35 near its periphery with the pole faces of the magnet on opposite sides of the wheel. A counterweight 38 is mounted diametrically opposite the magnet to provide balance and to insure proper rotation. Mounted within the hollow interior of the probe 12 is a coil 40 and a horseshoe-shaped element 42 of magnetic material. The horseshoe element 42 is positioned, as shown in FIG. 3, so that the wheel 35 and the magnet 37 mounted therein pass through the air gap defined by the open end of the horseshoe-shaped element 42. Leads from the coil 40 are spliced to a cable 44 which is fed to a suitable indicating meter or similar instrument. The remainder of the hollow interior of the probe 12 is filled with epoxy 46 to securely mount the coil 40 and the cable 44.

The operation of the underwater transducer may be described as follows. The probe 12 is placed in its operative position by means of the handle 18. The probe is designed to operate with the water flow passing over the inclined surface 32 of the probe 12 into and against the buckets 36. This causes the wheel 35 to rotate, thereby passing the magnet 37 through the ends of the horseshoe shaped element 42 to vary the reluctance of the magnetic path of the magnetic circuit. This results in a variation in the flux density of the coil 40, and an electromotive force is generated. The resulting current is fed through the cable 44 to a suitable electronic instrument such as disclosed in the aforementioned copending application. The latter briefly comprises an electronic module which analyzes the signal from the transducer coil and transmits it to a galvanometer-type meter which displays boat speed.

The frequency of the signal produced by the coil is proportional to the speed of rotation of the wheel 34 which, in turn, is dependent upon the relative movement of the probe in the water. This enables the aforementioned meter to provide an exceptionally accurate and sensitive measurement of boat speed. The number of pulses produced by the coil may be counted by a separate counter to provide an accurate indication of the distance travelled by the boat.

The water is free to flow past the wheel 35 because of the relief opening 34 on the downstream end of the slot 33. As mentioned above, this opening 34 prevents a buildup of pressure and also prevents accumulation of debris within the slot 33.

The inclined surface 32 of the probe 12 is designed to cause the water to flow down and over this surface, preventing the accumulation of separation bubbles of essentially stagnant water which would cause variations in the rotational characteristics of the wheel.

The underwater transducer 10 is particularly adapted for marine and nautical use because all operative parts are made of non-corrosive plastic materials which insure long and efficient operation in adverse water conditions.

What is claimed is:

1. An underwater transducer for producing signals indicative of fluid flow comprising an elongated probe having one end thereof adapted to project into said fluid, a water wheel having a plurality of circumferentially spaced means on the periphery thereof for catching fluid, means for mounting said water wheel at said end of the probe for rotation relative thereto about an axis perpendicular to the direction of said fluid flow when the probe is positioned in said fluid, said water wheel being partially recessed in the end face of said probe with a portion thereof projecting from said end face, magnetic pickup means mounted in said probe having an air gap extending through the recessed portion of said water wheel, and means at at least one point on said water wheel for periodically varying the reluctance of said air gap in response to rotation of said water wheel to produce a signal in said pickup means indicative of the rotation of said water wheel whereby said signal is indicative of said fluid flow.

2. The underwater transducer of claim 1 wherein at least one-half of said water wheel is recessed in said end face and the water wheel is a solid wheel which substantially fills the recess in said end face.

3. The underwater transducer of claim 1 wherein at least one-half of said water wheel on the upstream half of said water wheel is recessed in said end face when viewed from the upstream side of said probe.

4. The underwater transducer of claim 1 wherein said pickup means comprises a coil and first magnet mounted in the interior of said probe with the poles of said first magnet defining said air gap, a second magnet mounted near the radial edge of said rotatable wheel in position to pass through said air gap whereby the rotational movement of said second magnet on said wheel relative to the first magnet periodically varies the reluctance of said air gap to produce current pulses in said coil having a frequency proportional to the rotational speed of said wheel.

5. The underwater transducer of claim 4 including means connected to said magnetic circuit for transmitting signals representative of boat speed to a suitable indicating instrument.

6. The underwater transducer of claim 1 wherein the recess in the end face of said probe is an elongated slot having a pressure relief opening at its downstream end to aid in rotation of said wheel and to prevent fouling of said slot with debris.

7. The underwater transducer of claim 6 wherein said wheel is a solid wheel mounted on a bearing in such a manner that more than one half of said wheel projects into and substantially fills said elongated slot so the force carried by the fluid stream contacts the wheel in only a single direction to ensure proper rotational movement of said wheel.

8. The underwater transducer of claim 7 wherein said water wheel has a cylindrical periphery and said fluid catching means comprises a plurality of circumferentially spaced buckets recessed in said cylindrical surface.

9. The underwater transducer of claim 7 wherein the end of said probe forms a surface parallel to the axis of rotation of said water wheel which surface slopes from the upstream side of the probe toward the downstream side, the slope being such that at least one half of the upstream half of the water wheel is recessed and a greater portion of the downstream half of the water wheel is recessed.

10. The underwater transducer of claim 1 wherein the end of said probe has a surface parallel to the axis of rotation of said water wheel, said surface sloping from the upstream side of the probe toward the downstream side of the probe, the slope being such that more of the water wheel is recessed beneath said surface on the downstream side than the upstream side.

11. The underwater transducer of claim 10 wherein at least one-half of said water wheel on the upstream half of said water wheel is recessed beneath said surface.

12. The underwater transducer of claim 1, including mounting means adapted to be mounted on a wall, said mounting means having a passage extending therethrough, and means for removably and sealingly retaining said probe in an operative position in said passage with said end of the probe projecting beyond said mounting means into said fluid.

13. The underwater transducer of claim 12 wherein said means for removably and sealingly retaining said probe in said operative position also removably and sealingly retains said probe in an inoperative position relative to said passage, in said inoperative position said end of the probe being retracted within said passage.

References Cited

UNITED STATES PATENTS

| 2,782,638 | 2/1957 | Von Arx | 73—187 |
| 3,161,048 | 12/1964 | Pohl | 73—229 |

FOREIGN PATENTS

| 758,755 | 10/1956 | Great Britain. |
| 885,566 | 12/1961 | Great Britain. |

LOUIS R. PRINCE, Primary Examiner

D. M. YASICH, Assistant Examiner